US 6,728,448 B2

(12) United States Patent
Schmidt et al.

(10) Patent No.: US 6,728,448 B2
(45) Date of Patent: *Apr. 27, 2004

(54) DEVICE FOR GENERATING A QUADRANGULAR ILLUMINATING FIELD AND USE OF SUCH DEVICE IN AN OPTICAL DEVICE COMPRISING A SURFACE TO BE ILLUMINATED HAVING A PREDETERMINED SHAPE

(75) Inventors: Dietrich Schmidt, Jena (DE); Christfried Symanowski, Jena (DE); Gudrun Schroeter, Jena (DE)

(73) Assignee: Carl Zeiss Jena GmbH, Jean (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/041,059

(22) Filed: Jan. 7, 2002

(65) Prior Publication Data

US 2002/0114573 A1 Aug. 22, 2002

(30) Foreign Application Priority Data

Jan. 24, 2001 (DE) .......................... 101 03 098
Jan. 24, 2001 (DE) .......................... 101 03 097

(51) Int. Cl.$^7$ ................................ G02B 6/26
(52) U.S. Cl. ..................... 385/46; 385/15; 385/27; 385/39; 385/146
(58) Field of Search ..................... 385/15, 46, 146

(56) References Cited

U.S. PATENT DOCUMENTS

| 3,676,667 | A | | 7/1972 | Malifaud |
| 4,750,798 | A | * | 6/1988 | Whitehead ............ 385/133 |
| 4,813,765 | A | | 3/1989 | Negishi |
| 5,978,051 | A | | 11/1999 | Gohman et al. |
| 6,419,365 | B1 | * | 7/2002 | Potekev et al. ............ 353/98 |
| 6,443,576 | B1 | * | 9/2002 | Nishida et al. ............ 353/98 |
| 6,473,555 | B1 | * | 10/2002 | Kragl et al. ............ 385/146 |
| 6,517,210 | B2 | * | 2/2003 | Peterson et al. ............ 353/98 |
| 2001/0035941 | A1 | | 11/2001 | Peterson et al. |
| 2002/0114167 | A1 | * | 8/2002 | Schmidt et al. ............ 362/551 |

FOREIGN PATENT DOCUMENTS

| DE | EP 0562873 A1 | 3/1993 |
| DE | EP 0764862 A1 | 9/1995 |
| WO | WO 01/82632 A1 | 4/2001 |

* cited by examiner

Primary Examiner—John D. Lee
Assistant Examiner—Tina M Lin
(74) Attorney, Agent, or Firm—Eugene E. Renz, Jr.

(57) ABSTRACT

In a device for generating a quadrangular illuminating field, having a light mixing rod, which has a quadrangular cross-section as well as a quadrangular inlet area and a quadrangular outlet area and guides light coupled in via the inlet area to the outlet area, in order to generate therein the quadrangular illuminating field, the outlet area is limited by four rectilinear sides, of which two each meet in one of the corners of the outlet area at an angle which is not equal to 90°.

16 Claims, 3 Drawing Sheets

DEVICE FOR GENERATING A QUADRANGULAR ILLUMINATING FIELD AND USE OF SUCH DEVICE IN AN OPTICAL DEVICE COMPRISING A SURFACE TO BE ILLUMINATED HAVING A PREDETERMINED SHAPE

CROSS-REFERENCE TO RELATED APPLICATION

This application claims priority of German patent application no. 101 03 097.5, filed Jan. 24, 2001, the complete disclosure of which is hereby incorporated by reference.

FIELD OF THE INVENTION

The invention relates to a device for generating a quadrangular illuminating field, having a light mixing rod, which has a quadrangular cross-section as well as a quadrangular inlet area and a quadrangular outlet area and guides light coupled in via the inlet area to the outlet area, in order to generate therein the quadrangular illuminating field, said outlet area being limited by four rectilinear sides, of which two each converge in one of the corners of the outlet area. The invention further relates to the use of such device for generating a quadrangular illuminating field in an optical device comprising a surface to be illuminated, which has a predetermined shape, and illumination optics, which form an image of the outlet area on the surface to be illuminated.

BACKGROUND OF THE INVENTION

Such device for generating a quadrangular illuminating field is employed, for example, in the illumination optics of a digital projector, as it is called, which also comprises, in addition to the illumination optics, a generally rectangular imaging element, such as a tilting mirror matrix or an LCD matrix, and projection optics for projecting the image generated by the imaging element. In such a digital projector, it is required for high-quality images that the imaging element be illuminated as uniformly as possible by the illumination optics. Therefore, the illumination optics contain the light mixing rod, whose outlet area conventionally has a rectangular shape, if the imaging element is rectangular. It has been found, however, that a complicated optical system is necessary for forming an image of the illuminating field in the outlet area of the light mixing rod on the imaging element, so as to ensure that the image is formed in a manner as free from distortion as possible. In many cases, there also arises the additional problem that the outlet area and the surface of the imaging element are not situated in planes which are parallel to each other, but are inclined relative to each other, which also causes distortions leading to decreased uniformity of the illumination of the imaging element.

OBJECT AND SUMMARY OF THE INVENTION

Therefore, it is an object of the invention to improve the above-described type of device for generating a quadrangular illuminating field such that it allows illuminating, as uniformly as possible, a surface which is to be illuminated and has a predetermined shape.

According to the invention, this object is achieved, in connection with the above-described type of device for generating a quadrangular illuminating field, in that the two sides respectively meeting in one corner of the outlet area do not converge at a right angle. Preferably, all four interior angles have values differing from each other in the corners. Thus, the shape of the outlet area of the light mixing rod may be selected such that the distortion caused by forming an image of the outlet area on the surface to be illuminated is compensated. The surface to be illuminated will then be uniformly illuminated. The light mixing rod may preferably extend rectilinearly or at an angle.

In a preferred further embodiment of the device according to the invention, the light mixing rod is formed such that each of its cross-sectional areas is limited by four rectilinear sides, which converge at the same angles as the sides of the outlet area. This configuration allows the light mixing rod to be produced in a simple manner and with the required accuracy. Thus, for example, it may be formed as a solid mixing rod by grinding a blank, or as a hollow mixing rod with four reflectively coated plates.

Moreover, the device according to the invention may be further embodied such that the cross-sectional area of the light mixing rod decreases from the inlet area to the outlet area. Since, in a light mixing rod, the product of the inlet area with the aperture of the inlet area equals the product of the outlet area with the aperture of the outlet area, a larger aperture is possible at the outlet area. At the same time, the inlet area may be large, which facilitates the coupling-in of the light in the light mixing rod.

A particularly preferred further embodiment of the device according to the invention consists in that the light mixing rod is made of a light-transparent material and is, consequently, a solid mixing rod, in which the light which does not travel directly from the inlet area to the outlet area is guided by total reflexion. Since no losses occur in said total reflexion and, consequently, only the losses caused by material absorption are present, nearly all of the coupled-in light is guided to the outlet area, so that a very high efficiency in light transmission is realized. Moreover, it is also an advantage that excessive heating of the light mixing rod is prevented because total reflexion involves no losses which might contribute to such heating.

A particular further embodiment of the device according to the invention consists in that the light mixing rod has a hollow cross-section, which is formed by four reflective surfaces extending from the inlet area to the outlet area. This configuration of the light mixing rod allows simple and accurate production. A further particular advantage of this embodiment is that the outlet area is not formed by an end surface of the material, from which the light mixing rod is produced, but is the region at the end of the light mixing rod between the four reflective surfaces, thus usually an air portion, since the light mixing rod is conventionally present in a surrounding atmosphere and thus in air. This leads to the advantage that no soiling or misting, which might adversely affect the uniformity of the generated quadrangular illuminating field, can form in the outlet area.

In particular, the device according to the invention may be further embodied such that the light mixing rod comprises a solid mixing rod portion made of a light-transparent material and an end portion optically coupled therewith, which is provided with reflective surfaces and has a hollow cross-section and whose end averted from the solid mixing rod portion forms the outlet or inlet area. As the outlet or inlet area is formed by the end of the end portion averted from the solid mixing rod portion, this prevents that soiling or misting may accumulate on this surface, so that the illuminating field generated in the outlet area is not adversely affected.

An advantageous embodiment of the device according to the invention consists in that the light mixing rod comprises a first and second light guiding region for separately guiding components of the coupled-in light due to a partition extending from the inlet area to the outlet area. Thus, it is possible to create an intentional non-uniformity of the luminance in the illuminating field. This non-uniformity may be adapted to uniformly illuminate the surface to be illuminated.

The device according to the invention may be used, in particular, in an optical device comprising a surface to be illuminated, which has a predetermined shape, and illumination optics, which form an image of the outlet area on the surface to be illuminated. Preferably, the optical device also comprises projection optics for projecting the surface to be illuminated onto a projection surface. Thus, an optical device is provided wherein a more uniform illumination of the surface to be illuminated is possible due to the device according to the invention, because the distortions caused by the illumination optics may be compensated by suitably selecting the shape of the quadrangular outlet area of the light mixing rod.

The invention will be explained in more detail below by way of example and with reference to the drawings.

BRIEF DESCRIPTION OF THE DRAWINGS

These and other objects of the present invention and various features and details of the operation and construction thereof are hereinafter more fully set forth with reference to the accompanying drawings, wherein.

DETAILED DESCRIPTION OF THE PREFERRED EMBODIMENTS

Figure 3:
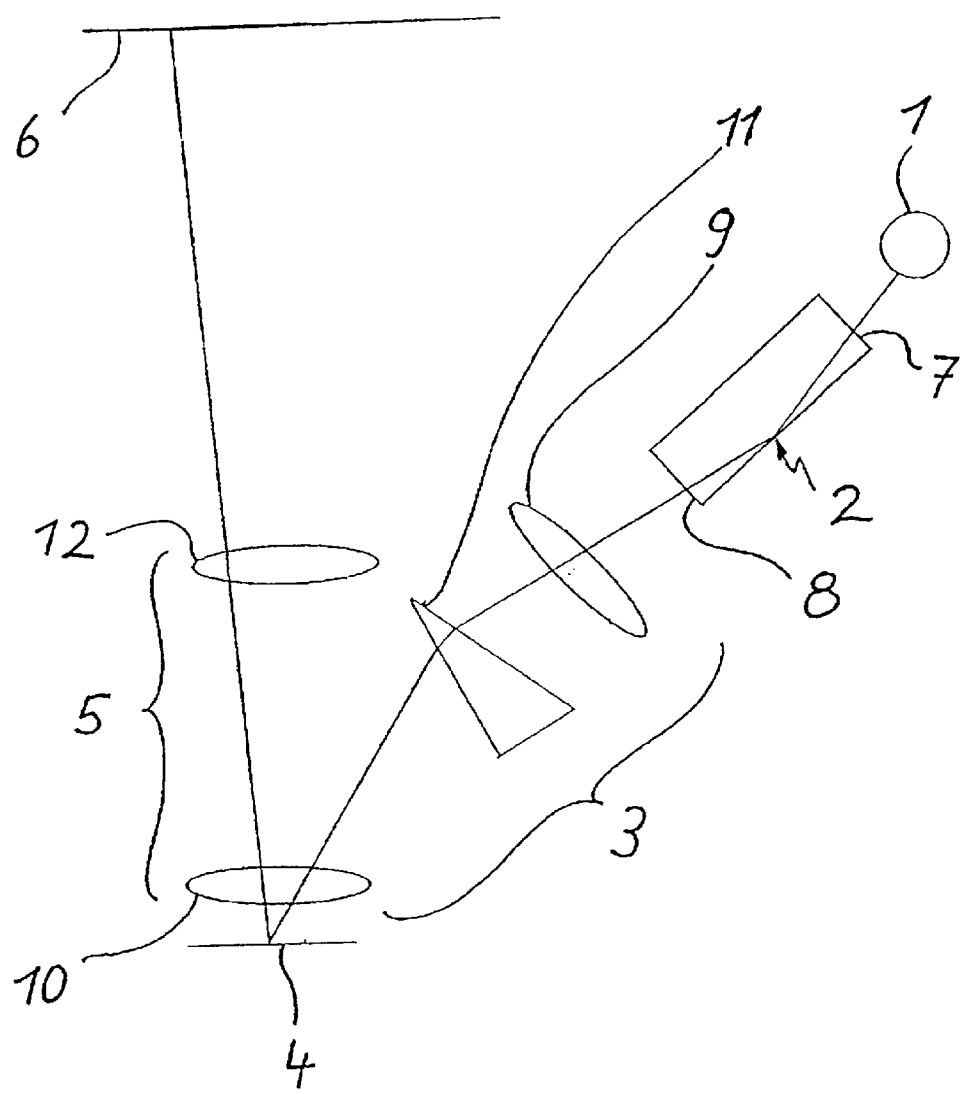
FIG. 3 is a schematic representation of an optical device according to the invention, which comprises the light mixing rod according to the invention as shown in FIGS. 1 and 2.

FIG. 3 shows a schematic top view of a projection device according to the invention, wherein a ray path is indicated by way of example. The projection device contains a light source 1, a light mixing rod 2, into which light from the light source 1 may be coupled, and, subsequent to the light mixing rod 2, illumination optics 3 which can illuminate a surface 4 to be illuminated by the light exiting from the light mixing rod 2. The surface 4 to be illuminated is preferably an imaging element and may, for example, be a tilting mirror matrix or an LCD matrix having a quadrangular, in particular a rectangular or square, shape. The projection device further comprises projection optics 5, by which the surface 4 to be illuminated may be projected onto a projection surface 6.

The light mixing rod 2 comprises an inlet area 7 facing the light source 1 and an outlet area 8 facing the illumination optics 3. It is arranged such that the outlet area 8 is not parallel to the surface 4 to be illuminated, but encloses an angle therewith, both in the top view shown in FIG. 3 and in a side view of the projection device.

The illumination optics 3 are designed such that an image of the outlet area 8 is formed on the surface 4 to be illuminated, and, to this end, they are provided with lens units 9, 10 and a deflecting prism 11. In the deflecting prism 11, the light exiting from the light mixing rod 2 is deflected only by refraction, and not by reflexion.

The projection optics 5 comprise the lens unit 10 and a further lens unit 12. By the use of the deflecting prism 11 and by employing the lens unit 10 for both the illumination optics 3 and the projection optics 5, a very compact projection device may be formed.

Figure 1:
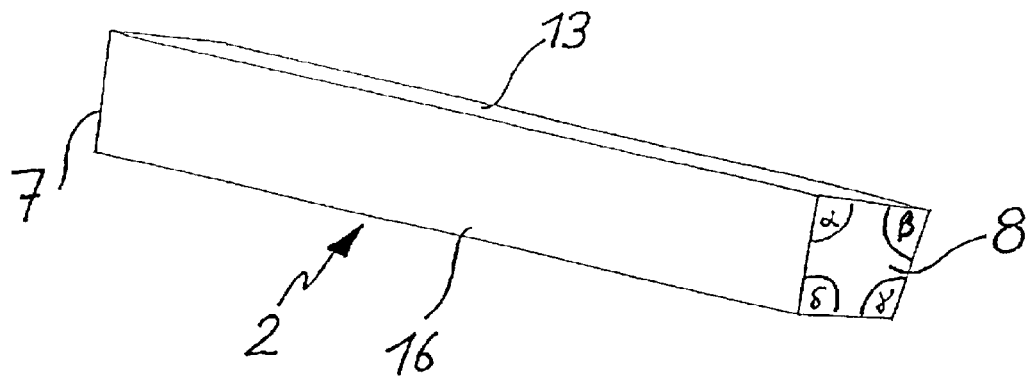
FIG. 1 is a perspective view of a light mixing rod according to the invention.
Figure 2:
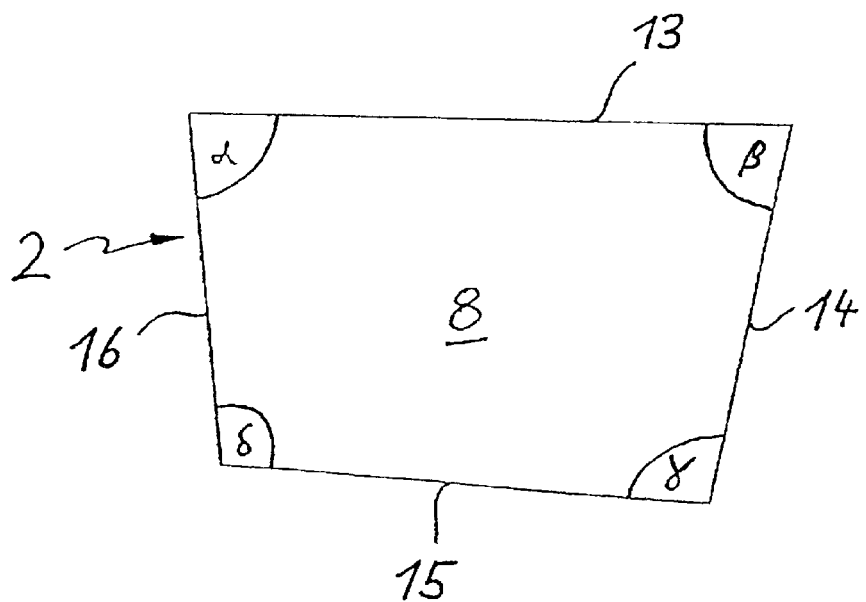
FIG. 2 is a front view of the light mixing rod according to the invention as shown in FIG. 1.

As best shown in FIGS. 1 and 2, the light mixing rod 2 consists of material transparent to light from the light source 1 and, by total reflexion at the interfaces between the side surfaces 13, 14, 15 and 16 of the light mixing rod 2 and the surrounding area, guides those light rays from the inlet area 7 to the outlet area 8 which do not travel directly from the inlet area 7 to the outlet area 8. Such a light mixing rod 2 is referred to as a "solid mixing rod".

The shape of the light mixing rod 2 is selected to have a quadrangular cross-section, wherein, in the case of the quadrangular outlet area 8, each of the interior angles $\alpha$, $\beta$, $\gamma$, $\delta$ has a different value and is not equal to 90°. The interior angles $\alpha$, $\beta$, $\gamma$, $\delta$ are selected such that the distortion in the image of the outlet area 8, which distortion is caused by the position of the outlet area 8 of the light mixing rod 2 relative to the surface 4 to be illuminated and by the illumination optics 3, is compensated so as to uniformly illuminate the surface 4 to be illuminated, which is a rectangular surface in this case. Preferably, the illumination optics 3 and the light mixing rod 2 are designed such that the surface 4 to be illuminated is slightly over-illuminated, i.e. the image of the outlet area 8 is somewhat larger than the surface 4 to be illuminated and protrudes on all four sides of the surface 4 to be illuminated. Thus, for example, the illumination of the surface 4 to be illuminated is ensured if the image of the outlet area still differs slightly from the rectangular shape or if the orientation of the surface 4 to be illuminated is not optimal.

The solid mixing rod 2 may be produced, for example, from a parallelepiped blank by grinding and polishing.

Figure 4:
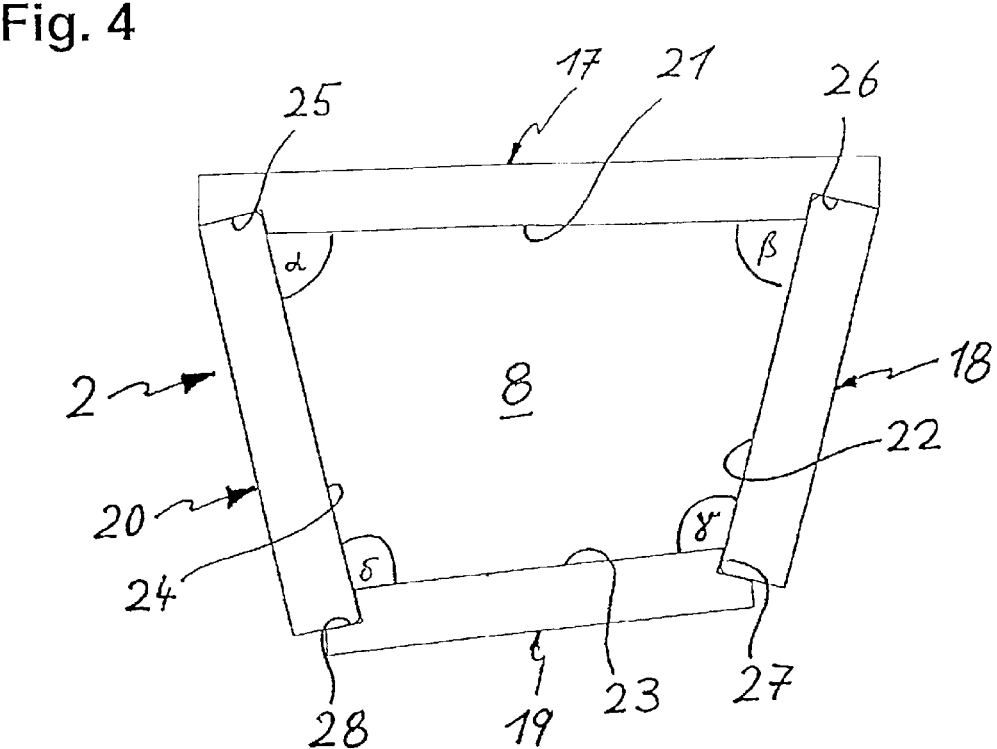
FIG. 4 is a front view of a light mixing rod of the invention according to another embodiment.

Alternatively, the light mixing rod 2 may be provided as a hollow mixing rod, as shown in FIG. 4. In this embodiment, the mixing rod is formed by four side plates 17, 18, 19 and 20, whose internal surfaces 21, 22, 23 and 24 are reflectively coated.

The four side plates 17 to 20 each form a substantially rectangular cross-section, with the side plates 17 and 19 being provided at their inner surfaces, at both ends, with recesses 25, 26, 27 and 28 which extend from the inlet area 7 to the outlet area 8. These recesses 25, 26, 27, 28, into which the side plates 18 and 20 are inserted, are designed such that the desired interior angles $\alpha$, $\beta$, $\gamma$, $\delta$ are present in the assembled state shown in FIG. 4. Preferably, the side plates 17 to 20 are held together by fitting a piece of shrink tubing (not shown) over the side plates in their assembled state shown in FIG. 4, which tubing is then heated and contracts so that the side plates 17 to 20 are urged together by elastic pretension. This shrink tubing may be disposed, for example, in a central portion of the light mixing rod 2. There may also be provided two pieces of shrink tubing, one in a region adjacent to the inlet area 7 and one in a region adjacent to the outlet area 8.

Figure 5:
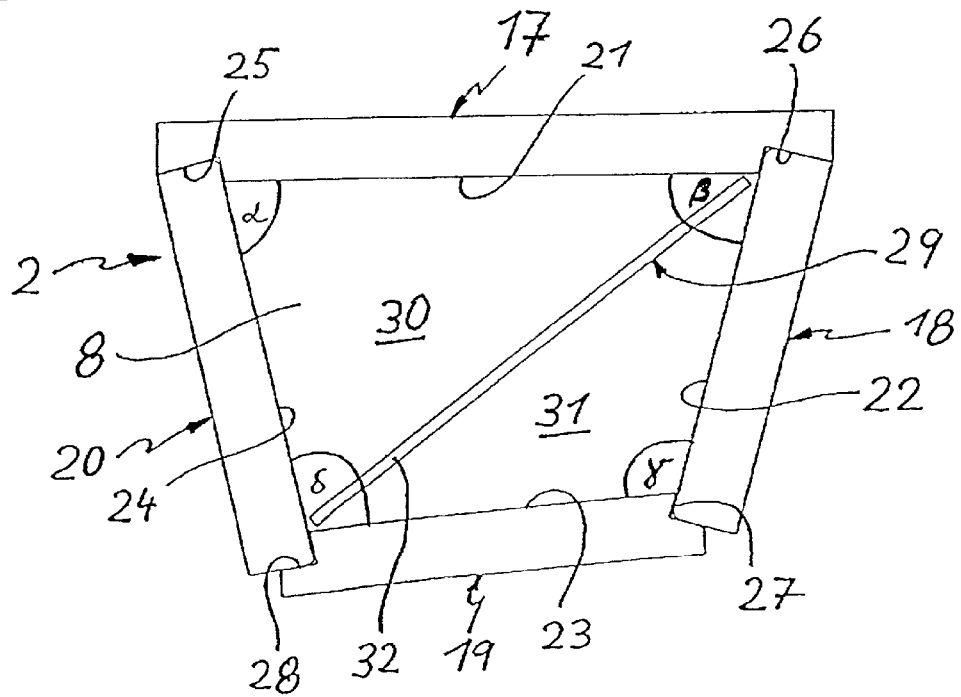
FIG. 5 is a front view of a further embodiment of the light mixing rod of FIG. 4.

FIG. 5 shows a further embodiment of the hollow mixing rod shown in FIG. 4. In this further embodiment, a partition is provided, which is formed by a plate 29 reflectively coated on both sides and extending from the inlet area 7 toward the outlet area 8, and, as shown in FIG. 5, is disposed diagonally, in cross-section, in the light mixing rod 2. This plate 29, which is reflectively coated on both sides, preferably extends a predetermined distance into the light mixing rod 2 from the inlet area 7, which predetermined distance may be one half to one third of the length of the light mixing rod 2. By this partition, first and second light guiding regions 30 and 31 are formed, each of which has a triangular shape in cross-section. Due to this cross-sectional shape, the luminance distribution at the end of the light guiding regions 30 and 31 is different than it is in the same place in the light mixing rod shown in FIG. 4, so that the luminance distribution in the outlet area 8 also differs from that of the light mixing rod 2 shown in FIG. 4. Thus, said partition leads to an intentional inhomogenization of the luminance distribution in the outlet area 8, which effect is even stronger as the length of the plate 29 increases. This may be employed, e.g. in the case of the projection device shown in FIG. 3, to illuminate the surface 4 to be illuminated even more uniformly. The plate 29 is preferably disposed in the hollow mixing rod 2 such that its front side 32 facing the outlet area 8 is not situated in the outlet area, but inside the hollow mixing rod 2. The front side 32 and the corresponding opposite front side at the other end of the plate may be polished and plane, if the plate 29 is made of a light-transparent material, so that the plate 29 serves as a light guide for the light incident on the opposite front side. Then, only the minor losses of reflection and absorption occur, so that the plate 29 advantageously causes only very minor losses. Alternatively, the opposite front side may also be blackened, so that the light incident thereon is not passed on, but is blocked.

In a further preferred embodiment of the invention, such partition, in accordance with the embodiment of FIG. 5, may also be provided in a solid mixing rod. To this end, the starting portion of the light mixing rod 2, which is to be provided with the partition, is formed by two prisms separated from each other by a gap. At the interfaces between the prism surfaces and the gap, total reflexion of light rays having predetermined angles occurs, so that the gap between the prisms also provides a partition leading to the inhomogenization of the luminance distribution in the outlet area 8.

What is claimed is:

1. A device for generating a quadrangular illuminating field, having a light mixing rod, which has a quadrangular cross-section as well as a quadrangular inlet area and a quadrangular outlet area, and guides light coupled in via the inlet area to the outlet area, in order to generate therein the quadrangular illuminating field, said outlet area being limited by four rectilinear sides, of which two each meet in one of the corners of the outlet area, wherein the sides meeting in one corner converge at an angle which is not equal to 90° and the cross-sectional area of the light mixing rod decreases from the inlet area toward the outlet area.

2. The device as claimed in claim 1, wherein the sides converge at an angle of different size in each corner.

3. The device as claimed in claim 1, wherein the light mixing rod is formed such that each of its cross-sectional areas is limited by four rectilinear sides, which converge at the same angles as the sides of the outlet area.

4. The device as claimed in claim 1, wherein the light mixing rod is a solid mixing rod made of a light-transparent material.

5. The device as claimed in claim 1, wherein the light mixing rod has a hollow cross-section, which is formed by four reflective surfaces extending from its inlet area to its outlet area.

6. The device as claimed in claim 1, wherein the light mixing rod comprises first and second light guiding regions for separately guiding components of the coupled-in light due to a partition extending from the inlet area toward the outlet area.

7. The use of a device for generating a quadrangular illuminating field as claimed in claim 1 in an optical device comprising a surface to be illuminated, which has a predetermined shape, and illumination optics, which form an image of the outlet area on the surface to be illuminated.

8. The use as claimed in claim 7, wherein the optical device further comprises projection optics for projecting the surface to be illuminated onto a projection surface.

9. A device for generating a quadrangular illuminating field, having a light mixing rod, which has a quadrangular cross-section as well as a quadrangular inlet area and a quadrangular outlet area, and guides light coupled in via the inlet area to the outlet area, in order to generated therein the quadrangular illuminating field, said outlet area being limited by four rectilinear sides, of which two each meet in one of the corners of the outlet area, wherein the sides meeting in one corner each converge at an angle which is not equal to 90° and the light mixing rod comprises first and second light guiding regions for separately guiding components of the coupled-in light due to a partition extending from the inlet area toward the outlet area.

10. The device as claimed in claim 9, wherein the sides converge at an angle of different sizes in each corner.

11. The device as claimed in claim 9, wherein the light mixing rod is formed such that each of its cross-sectional areas is limited by four rectilinear sides, which converge at the same angles as the sides of the outlet area.

12. The device as claimed in claim 9, wherein the cross-sectional area of the Light mixing rod decreases from the inlet area toward the outlet area.

13. The device as claimed in claim 9, wherein the light mixing rod is a solid mixing rod made of a light-transparent material.

14. The device as claimed in claim 9, wherein the light mixing rod has a hollow cross-section, which is formed by four reflective surfaces extending from its inlet area to its outlet area.

15. The use of a device for generating a quadrangular illuminating field as claimed in claim 9 in an optical device comprising a surface to be illuminated, which has a predetermined shape, and illumination optics, which form an image of the outlet area on the surface to be illuminated.

16. The use as claimed in claim 15, wherein the optical device further comprises projection optics for projecting the surface to be illuminated onto a projection surface.

* * * * *